United States Patent
Lin et al.

(10) Patent No.: US 11,382,079 B2
(45) Date of Patent: Jul. 5, 2022

(54) METHOD FOR DETERMINING UPLINK CONTROL INFORMATION AND COMMUNICATIONS DEVICE

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/131,694

(22) Filed: Dec. 22, 2020

(65) Prior Publication Data

US 2021/0112545 A1 Apr. 15, 2021

Related U.S. Application Data

(63) Continuation of application No. PCT/CN2018/113844, filed on Nov. 2, 2018.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1812* (2013.01); *H04L 1/1854* (2013.01); *H04L 5/0055* (2013.01)

(58) Field of Classification Search
None
See application file for complete search history.

(56) References Cited

U.S. PATENT DOCUMENTS

2011/0243066 A1* 10/2011 Nayeb Nazar ........ H04L 1/1671
370/328
2014/0169319 A1 6/2014 Yang et al.
(Continued)

FOREIGN PATENT DOCUMENTS

| CN | 107466084 | 12/2017 |
| CN | 108365922 | 8/2018 |

(Continued)

OTHER PUBLICATIONS

WIPO, ISR and WO for PCT/CN2018/113844, Jul. 29, 2019.
(Continued)

*Primary Examiner* — Hassan A Phillips
*Assistant Examiner* — Gautam Sharma
(74) *Attorney, Agent, or Firm* — Hodgson Russ LLP

(57) ABSTRACT

A method for determining uplink control information and a communications device are disclosed in implementation of this application. The method includes: obtaining, by a communications device, a target parameter set, where the target parameter set includes at least one first parameter value and at least one second parameter value, the at least one first parameter value is used for transmitting a first kind of data, and the at least one second parameter value is not used for transmitting the first kind of data; and determining, by the communications device according to the at least one first parameter value, a quantity of bits for transmission of feedback information associated with the first kind of data.

12 Claims, 3 Drawing Sheets

(56) References Cited

U.S. PATENT DOCUMENTS

| | | | | |
|---|---|---|---|---|
| 2015/0092628 A1* | 4/2015 | Zhao | ............... | H04W 72/0413 370/280 |
| 2015/0092702 A1* | 4/2015 | Chen | ............... | H04W 72/082 370/329 |
| 2015/0201388 A1* | 7/2015 | Cheng | ............... | H04W 52/281 370/329 |
| 2015/0312922 A1* | 10/2015 | Uchino | ............... | H04W 76/15 370/329 |
| 2015/0327231 A1* | 11/2015 | Wang | ............... | H04L 5/0053 370/329 |
| 2016/0330010 A1* | 11/2016 | Qin | ............... | H04L 5/0055 |
| 2017/0013565 A1* | 1/2017 | Pelletier | ............... | H04W 52/365 |
| 2017/0257860 A1* | 9/2017 | Nam | ............... | H04W 72/0446 |
| 2018/0192416 A1 | 7/2018 | Yin et al. | | |
| 2018/0279298 A1* | 9/2018 | Wang | ............... | H04L 1/0026 |
| 2019/0098654 A1* | 3/2019 | Li | ............... | H04L 5/0055 |
| 2019/0364543 A1* | 11/2019 | Ugurlu | ............... | H04L 1/1819 |
| 2020/0106539 A1* | 4/2020 | Yu | ............... | G08C 19/28 |
| 2020/0137768 A1* | 4/2020 | Jose | ............... | H04W 72/10 |
| 2020/0252167 A1* | 8/2020 | Kwak | ............... | H04L 1/16 |
| 2020/0359403 A1* | 11/2020 | Lee | ............... | H04W 72/1284 |

FOREIGN PATENT DOCUMENTS

| | | |
|---|---|---|
| CN | 108633088 | 10/2018 |
| CN | 110291745 | 9/2019 |
| RU | 2582072 | 4/2016 |
| WO | 2019223719 | 11/2019 |

OTHER PUBLICATIONS

CNIPA, First Office Action for ON Application No. 202010538063.8, Jul. 1, 2021.
EPO, Extended European Search Report for EP Application No. 18938979.4, dated Jun. 16, 2021.
Institute for Information Industry (III), "HARQ-ACK feedback enhancement for URLLC", 3GPP TSG RAN WG 1 Meeting #94bis, R1-1811391, Oct. 2018.
CNIPA, Notice of Priority Review of Patent Application for CN Application No. 202010538063.8, Jun. 16, 2021.
Catt, "NR-PUCCH design for low latency communications," 3GPP TSG RAN WG1 Meeting #88bis, R1-1704581, Apr. 2017.
Fujitsu, "Discussion on HARQ-ACK feedback over PUCCH and PUSCH," 3GPP TSG RAN WG1 Meeting #94bis, R1-1810596, Oct. 2018.
ZTE et al., "HARQ-ACK multiplexing and bundling," 3GPP TSG RAN WG1 Meeting 90bis, R1-1717041, Oct. 2017.
EPO, Communication for EP Application No. 18938979.4, dated Dec. 23, 2021.
CNIPA, Notification to Grant Patent Right for Invention for CN Application No. 202010538063.8, dated Nov. 2, 2021.
IPIN, Examination Report issued in IN Application No. 202127001240, dated Feb. 16, 2022.
CIPO, Office Action issued in CA Application No. 3,105,883, dated Jan. 26, 2022.
FSIP, Office Action for RU Application No. 2021101711/07, dated Apr. 14, 2022.

* cited by examiner

METHOD FOR DETERMINING UPLINK CONTROL INFORMATION AND COMMUNICATIONS DEVICE

CROSS-REFERENCE TO RELATED APPLICATION

The present application is a continuation of International Application No. PCT/CN2018/113844, filed Nov. 2, 2018, the entire disclosure of which is incorporated herein by reference.

BACKGROUND

Technical Field

This application relates to the field of mobile communications technologies, and in particular, to a method for determining uplink control information and a communications device.

Related Art

In a 5G new radio (NR) system, ACK/NACK multiplex transmission is supported. That is, ACK/NACK corresponding to a plurality of physical uplink control channels (PDSCHs) is transmitted by a physical uplink control channel (PUCCH). When it is configured that the quantity of ACK/NACK bits is determined semi-statically, the terminal determines the quantity of ACK/NACK bits according to a configured relevant parameter.

An ultra-reliable low-latency communication (URLLC) service has a high requirement on delay. If the URLLC service and an enhanced mobile bandwidth (eMBB) service share a same downlink control information (DCI) format, a value range of each information domain in DCI needs to satisfy requirements of the URLLC service and the eMBB service at the same time. However, this results in a large amount of redundant information in feedback information.

SUMMARY

Implementations of this application provide a method for determining uplink control information and a communications device.

An implementation of this application provides a method for determining uplink control information. The method includes:

obtaining, by a communications device, a target parameter set, where the target parameter set includes at least one first parameter value and at least one second parameter value, the at least one first parameter value is used for transmitting a first kind of data, and the at least one second parameter value is not used for transmitting the first kind of data; and determining, by the communications device according to the at least one first parameter value, a quantity of bits for transmission of feedback information associated with the first kind of data.

An implementation of this application provides a communications device. The communications device includes an obtaining unit and a determining unit, where the obtaining unit is configured to obtain a target parameter set, where the target parameter set includes at least one first parameter value and at least one second parameter value, the at least one first parameter value is used for transmitting a first kind of data, and the at least one second parameter value is not used for transmitting the first kind of data; and the determining unit is configured to determine, according to the at least one first parameter value, a quantity of bits for transmission of feedback information associated with the first kind of data.

An implementation of this application provides a communications device, including a processor and a memory. The memory is configured to store a computer program.

The processor is configured to invoke and run the computer program stored in the memory to perform the foregoing method for determining uplink control information.

An implementation of this application provides a chip, configured to implement the foregoing method for determining uplink control information.

Specifically, the chip includes: a processor, configured to invoke a computer program from a memory and run the computer program to cause a device installed with the chip to perform the foregoing method for determining uplink control information.

An implementation of this application provides a computer-readable storage medium, configured to store a computer program, the computer program causing a computer to perform the foregoing method for determining uplink control information.

An implementation of this application provides a computer program product including computer program instructions, the computer program instructions causing a computer to perform the foregoing method for determining uplink control information.

An implementation of this application further provides a computer program, the computer program, when run in a computer, causing the computer to perform the foregoing method for determining uplink control information.

BRIEF DESCRIPTION OF THE DRAWINGS

The accompanying drawings described herein are used for providing a further understanding of this application, and constitute a part of this application. Exemplary implementations of this application and descriptions thereof are used for explaining this application, and do not constitute any improper limitation to this application. In the accompanying drawings.

DETAILED DESCRIPTION

The following describes the technical solutions in the implementations of this application with reference to the accompanying drawings in the implementations of this application. Apparently, the described implementations are some implementations of this application rather than all of the implementations. All other implementations obtained by a person of ordinary skill in the art based on the implementations of this application without creative efforts shall fall within the protection scope of this application.

The technical solutions in the implementations of this application may be applied to various communications systems, such as a Global System For Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), a Worldwide Interoperability for Microwave Access (WiMAX) communications system, or a 5G system.

Figure 1:
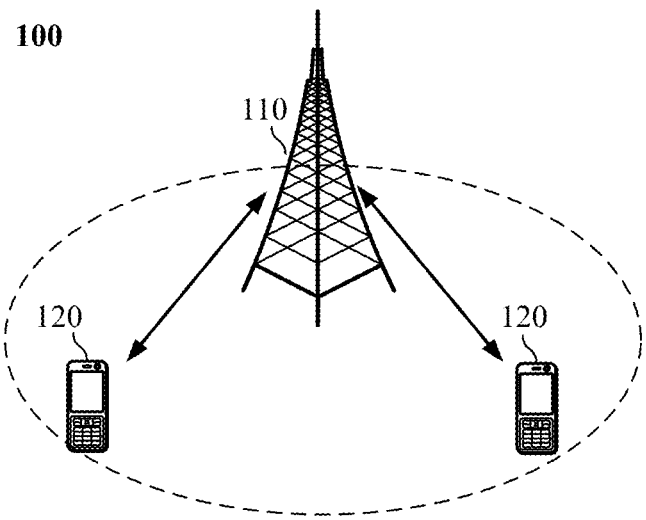
FIG. 1 is a schematic diagram of a communications system architecture according to an implementation of this application.

For example, a communications system 100 to which implementations of this application are applied is shown in FIG. 1. The communications system 100 includes a network device 110. The network device 110 may be a device that communicates with a terminal 120 (or referred to as a communications terminal, or a terminal). The network device 110 may provide communications coverage for a specific geographic area, and may communicate with a terminal located within the coverage area. In at least one implementation, the network device 110 may be a base transceiver station (BTS) in the GSM system or the CDMA system, or may be a NodeB in the WCDMA system, or may be an evolved NodeB (eNB or eNodeB) in the LTE system, or a radio controller in a cloud radio access network.

Alternatively, the network device may be a mobile switching center, a relay station, an access point, an in-vehicle device, a wearable device, a hub, a switch, a bridge, a router, a network side device in the 5G network, a network device in a future evolved Local Public Land Mobile Network (PLMN), or the like.

The communications system 100 further includes at least one terminal 120 located within the coverage area of the network device 110. As used herein, "terminal" includes, but is not limited to, being connected through a wired line, for example, a public switched telephone network (PSTN), a digital subscriber line (DSL), a digital cable, a direct cable connection; and/or another data connection/network; and/or a wireless interface, for example, a cellular network, a wireless local area network (WLAN), a digital television network such as a digital television network of a DVB-H network, a satellite network, an AM-FM broadcast transmitter; and/or an apparatus of another terminal, which is configured to receive/send a communications signal; and/or an Internet of Things (IoT) device. A terminal configured to communicate through a wireless interface may be referred to as a "wireless communications terminal", a "wireless terminal", or a "mobile terminal". Examples of the mobile terminal include, but are not limited to, a satellite or a cellular phone; a personal communications system (PCS) terminal that may combine a cellular radio telephone with data processing, a fax, and a data communication capability; a PDA that may include a radio telephone, a pager, Internet/Intranet access, a Web browser, a notepad, a calendar, and/or a Global Positioning System (GPS) receiver; and a regular laptop and/or palmtop receiver or other electronic devices that include a radio telephone transceiver. The terminal may refer to an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular telephone, a cordless telephone, a Session Initiation Protocol (SIP) phone, a wireless local loop (WLL) station, a personal digital assistant (PDA), a handheld device having a wireless communications capability, a computing device, or another processing device connected to a wireless modem, an in-vehicle device, a wearable device, a terminal in the 5G network, a terminal in a future evolved PLMN, or the like.

In at least one implementation, terminal device-to-device (D2D) communication may be performed between the terminals 120.

In at least one implementation, the 5G system or the 5G network may also be referred to as a new radio (NR) system or an NR network.

FIG. 1 shows one network device and two terminals as an example. In at least one implementation, the communications system 100 may include a plurality of network devices, and other quantities of terminals may be included within a coverage area of each network device. This is not limited in the implementation of this application.

In at least one implementation, the communications system 100 may further include other network entities such as a network controller, and a mobility management entity. This is not limited in the implementation of this application.

It should be understood that, a device having a communications function in a network/system in the implementation of this application may be referred to as a communications device. Using the communications system 100 shown in FIG. 1 as an example, the communications device may include the network device 110 and the terminal 120 that have the communications function. The network device 110 and the terminal 120 may be specific devices described above, and are not described herein again. The communications device may also be other devices in the communications system 100, for example, other network entities such as a network controller, and a mobility management entity. This is not limited in the implementation of this application.

It should be understood that, the terms "system" and "network" in this specification are generally used interchangeably in this specification. The term "and/or" in this specification is merely an association relationship for describing associated objects and represents that three kinds of relationships may exist. For example, A and/or B may represent the following three cases: Only A exists, both A and B exist, and only B exists. In addition, the character "/" in this specification generally indicates an "or" relationship between the associated objects.

The technical solutions in the implementations of the present invention are mainly applied to a 5G mobile communications system. Certainly, the technical solutions in the implementations of the present invention are not limited to the 5G mobile communications system, and may be further applied to other kinds of mobile communications systems.

Figure 2:
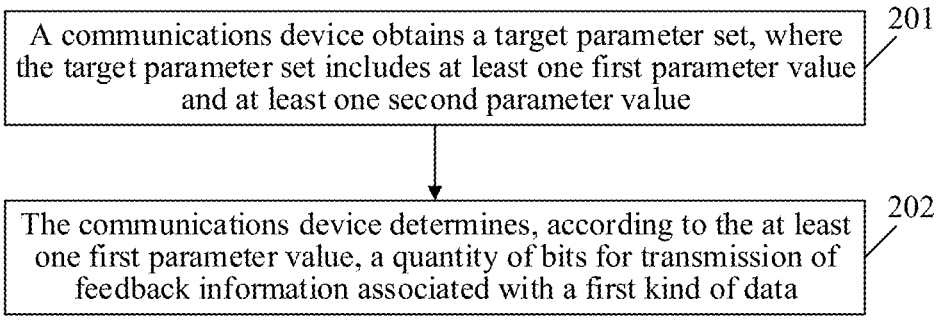
FIG. 2 is a schematic flowchart of a method for determining uplink control information according to an implementation of this application.

An implementation of this application provides a method for determining uplink control information. FIG. 2 is a schematic flowchart of a method for determining uplink control information according to an implementation of this application. As shown in FIG. 2, the method includes the following steps:

Step 201: A communications device obtains a target parameter set, where the target parameter set includes at least one first parameter value and at least one second parameter value, the at least one first parameter value is used for transmitting a first kind of data, and the at least one second parameter value is not used for transmitting the first kind of data.

Step 202: The communications device determines, according to the at least one first parameter value, a quantity of bits for transmission of feedback information associated with the first kind of data.

In this implementation, the target parameter set includes at least one first parameter value used for transmitting a first kind of data and at least one second parameter value that is not used for transmitting the first kind of data. Therefore, the communications device determines, according to the at least one first parameter value, a quantity of bits for transmission of feedback information associated with the first kind of data.

Alternatively, the target parameter set includes at least one second parameter value, where the at least one second parameter value is not used for transmitting the first kind of data. The communications device determines, according to other parameter values except the at least one second parameter value in the target parameter set, the quantity of bits for transmission of the feedback information associated with the first kind of data.

In this implementation, the target parameter set includes at least one of the following parameter sets: a hybrid automatic repeat request (HARQ) feedback timing set or a physical downlink shared channel time domain resource set.

It can be understood that, the communications device determines, according to the parameter values used for transmitting the first kind of data in the HARQ feedback timing set and/or the physical downlink shared channel (PDSCH) time domain resource set, the quantity of bits for transmission of the feedback information associated with the first kind of data.

In this implementation, the communications device may be a terminal or a network device. For descriptions of the terminal and the network device, refer to the corresponding descriptions in FIG. 1. Details are not described herein again.

In an optional implementation of this application, when the communications device is a terminal, the method further includes: receiving, by the communications device, a plurality of kinds of data, where parameters of different kinds of data in the plurality of kinds of data are different, and the plurality of kinds of data includes the first kind of data.

That the parameters of different kinds of data in the plurality of kinds of data are different includes at least one of the following: priorities of different kinds of data in the plurality of kinds of data are different; service kinds of different kinds of data in the plurality of kinds of data are different; reliability requirement parameters of different kinds of data in the plurality of kinds of data are different; feedback delay requirement parameters of different kinds of data in the plurality of kinds of data are different; and transmission time interval lengths used by different kinds of data in the plurality of kinds of data are different.

In an example, the priorities of data may be represented by a quality of service (QoS) parameter. That is, different kinds of data have different QoS parameters. In an example, different kinds of data may have different service kinds. For example, the service kinds of data may include URLLC service data, eMBB service data, and definitely are not limited to the foregoing service kinds. In an example, different kinds of data may be distinguished according to a delay requirement and/or a reliability requirement. For example, the URLLC service data has a relatively short feedback delay, or the transmission time interval length used by the URLLC service data is relatively short. For another example, the eMBB service data has a relatively long feedback delay, or the transmission time interval length used by the eMBB service data is relatively long.

In an optional implementation of this application, the plurality of kinds of data shares the target parameter set. That is, in this implementation, the parameter values in the same target parameter set are used for determining the quantity of bits for transmission of the feedback information associated with the plurality of kinds of data.

In an optional implementation of this application, the method further includes:
determining data kinds of the plurality of kinds of data based on the parameter values in the target parameter set. It can be understood that, the communications device may determine a corresponding data kind according to a parameter value in the target parameter set, where the determined data kind is one kind in the plurality of kinds of data.

In an optional implementation of this application, the method further includes:
determining, by the communications device, whether a parameter value in the target parameter set satisfies a first threshold range, and determining, according to a determining result, whether the corresponding parameter value is used for transmitting the first kind of data.

In this implementation, depending on a different kind of the first kind of data, a corresponding first threshold range is also different. In a first implementation, the first threshold range may be greater than or equal to a first threshold. That is, the first threshold range is from the first threshold to positive infinity. In a second implementation, the first threshold range may be less than or equal to a second threshold. That is, the first threshold range is from the second threshold to negative infinity. In a third implementation, the first threshold range may be greater than or equal to a third threshold and less than or equal to a fourth threshold (herein, the third threshold is less than the fourth threshold). That is, the first threshold range is between the third threshold and the fourth threshold.

Different kinds of data being URLLC service data and eMBB service data respectively is used as an example. The URLLC service data and the eMBB service data correspond to different granularity sizes of the parameter values in the target parameter set. Because the URLLC service data has a higher delay requirement than the eMBB service data, a smaller-granularity parameter value, for example, a smaller-granularity HARQ feedback timing value such as a symbol-level or half-slot-level HARQ feedback timing value, is required, and a large-granularity HARQ feedback timing value (for example, a slot-level HARQ feedback timing value) is not used for transmitting the URLLC service data.

Based on this, in an example, if the first kind of data is the URLLC service data, the communications device determines whether a parameter value in the target parameter set is less than or equal to the second threshold. If the parameter value is less than or equal to the second threshold, the corresponding parameter value is a first parameter value used for transmitting the first kind of data. If the parameter value is greater than the second threshold, the corresponding parameter value is a second parameter value not used for transmitting the first kind of data.

In another example, if the first kind of data is the eMBB service data, the communications device determines whether a parameter value in the target parameter set is greater than or equal to the first threshold. If the parameter value is greater than or equal to the first threshold, the corresponding parameter value is a first parameter value used for transmitting the first kind of data. If the parameter value is less than the first threshold, the corresponding parameter values is a second parameter value not used for transmitting the first kind of data.

In at least one implementation, the method further includes: when the communications device is a terminal, receiving, by the communications device, the first threshold range configured by a network device; or determining, by the communications device, the first threshold range based on a pre-agreed manner.

It can be understood that, when the communications device is a terminal, the first threshold range in this implementation of this application may be configured by a network device. When the communications device is a terminal or a network device, the first threshold range in this implementation of this application may alternatively be determined based on a pre-agreed (for example, protocol agreement) manner.

In an optional implementation of this application, the method further includes: determining, by the communications device according to a granularity associated with a parameter value in the target parameter set, whether the corresponding parameter value is used for transmitting the first kind of data. When the target parameter set includes an HARQ feedback timing set and/or a physical downlink shared channel time domain resource set, the communications device determines, according to a duration granularity associated with a parameter value in the target parameter set, whether the corresponding parameter value is used for transmitting the first kind of data.

In an example, the communications device may determine, according to a duration unit corresponding to a parameter value in the target parameter set, whether the corresponding parameter value is used for transmitting the first kind of data. Different duration units correspond to different duration granularities. For example, the duration unit is a slot, a symbol, half of a slot, or the like.

In this implementation, because different kinds of data correspond to different granularity sizes of the parameter values in the target parameter set, the communications device determines, according to the duration granularities corresponding to the parameter values in the target parameter set, whether the corresponding parameter values are used for transmitting the first kind of data. In an example, if the data is URLLC service data, this kind of data has a relatively high delay requirement. Therefore, a smaller-granularity parameter value, for example, a smaller-granularity HARQ feedback timing value such as a symbol-level or half-slot-level HARQ feedback timing value, is required.

In an optional implementation of this application, the quantity of bits is a quantity of bits of the feedback information transmitted by a physical channel. Alternatively, the quantity of bits is a quantity of bits of the feedback information transmitted by a time unit. For example, the quantity of bits is a quantity of bits of the feedback information transmitted by a slot or a sub-slot.

In an optional implementation of this application, the obtaining, by the communications device, a target parameter set includes: when the communications device is a terminal, obtaining, by the communications device, the target parameter set configured by a network device; or obtaining, by the communications device, the target parameter set based on a pre-agreed manner.

In this implementation, in an implementation, the communications device (namely, the terminal) may obtain the target parameter set configured by the network device through dedicated signaling. In another implementation, the communications device may alternatively obtain the target parameter set based on the pre-agreed manner (for example, a protocol agreement manner).

In an optional implementation of this application, when the communications device is a terminal, the method further includes: sending, by the terminal, the feedback information satisfying the quantity of bits to the network device.

In an optional implementation of this application, when the communications device is a network device, the method further includes: receiving, by the network device from a terminal, the feedback information satisfying the quantity of bits.

The method for determining uplink control information in this implementation of this application is described in detail below by using an example in which the communications device is a terminal and with reference to specific examples.

EXAMPLE 1

A base station configures an HARQ feedback timing set $K_1$: {1 slot, 2 slots, 3 slots, 4 slots} for the terminal. Because URLLC service data has a relatively high delay requirement, HARQ feedback timing values form 2 slots to 4 slots are not used for transmitting the URLLC service data. Therefore, when determining a quantity of bits of feedback information for the URLLC service data, the terminal determines the quantity of bits of the feedback information only according to 1 slot. Alternatively, the terminal determines, according to the delay requirement of the URLLC service data, a subset $\tilde{K}_1$: {1 slot} satisfying the delay requirement from the HARQ feedback timing set $K_1$, and determines the quantity of bits of the feedback information for the URLLC service data based on $\tilde{K}_1$.

Figure 3:
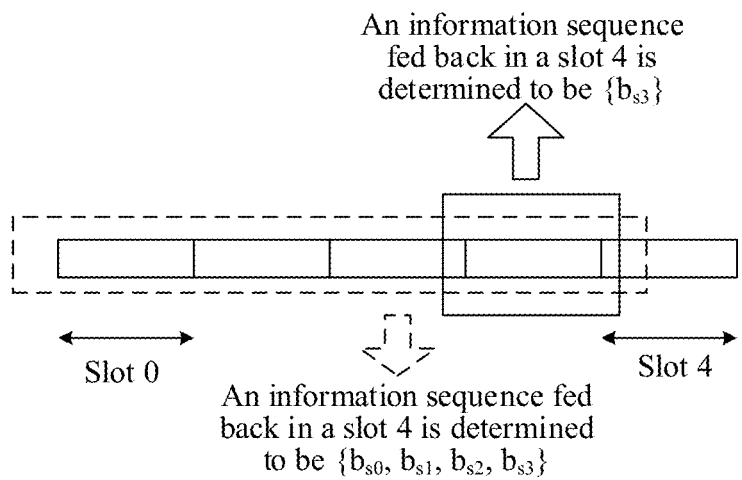
FIG. 3 is a schematic application diagram of a method for determining uplink control information according to an implementation of this application.

For details, reference may be made to FIG. 3. If the quantity of bits of the feedback information is determined by using the at least one first parameter value that is only used for transmitting the first kind of data in this implementation of the application, an information sequence fed back in a slot 4 is only {bs3}. However, in the existing solution, the information sequence fed back in the slot 4 includes {$b_{s0}$, $b_{s1}$, $b_{s2}$, $b_{s3}$}, while {$b_{s0}$, $b_{s1}$, $b_{s2}$} is redundant information for the first kind of data.

In other words, when determining the quantity of bits of the feedback information for service data of which a delay of the feedback response information is less than or equal to 1 slot, the terminal determines the quantity of bits of the feedback information only according to 1 slot.

For eMBB service data, because a delay requirement of the eMBB service data is not high, the HARQ feedback timing values form 2 slots to 4 slots are used for transmitting the eMBB service data. Therefore, when determining a quantity of bits of feedback information for the eMBB service data, the terminal may determine the quantity of bits of the feedback information according to 2 slots to 4 slots. Alternatively, the terminal determines, according to the delay requirement of the eMBB service data, a subset $\tilde{K}_1$: {2 slots, 3 slots, 4 slots} satisfying the delay requirement from the HARQ feedback timing set $K_1$, and determines the quantity of bits of the feedback information for the eMBB service data based on $\tilde{K}_1$.

EXAMPLE 2

A base station configures an HARQ feedback timing set $K_1$: {2 symbols, 4 symbols, 7 symbols, 10 symbols, 1 slot, 2 slots, 3 slots, 4 slots} for the terminal. Because URLLC service data has a relatively high delay requirement, slot-level HARQ feedback timing values are not used for transmitting the URLLC service data. Therefore, when determining a quantity of bits of feedback information for the URLLC service data, the terminal determines the quantity of bits of the feedback information only according to 2 symbols, 4 symbols, 7 symbols, and 10 symbols. Alternatively, the terminal determines, according to the delay requirement of the URLLC service data, a subset $\tilde{K}_1$: {2 symbols, 4 symbols, 7 symbols, 10 symbols} satisfying the delay requirement from the HARQ feedback timing set $K_1$, and determines the quantity of bits of the feedback information for the URLLC service data based on $\tilde{K}_1$.

EXAMPLE 3

The terminal determines a PDSCH time domain resource set according to a protocol agreement or configuration by the base station configures. As shown in Table 1, column L represents a PDSCH duration length (that is, a quantity of time domain symbols). Because URLLC service data has a relatively high delay requirement, a short TTI is required for transmission. For example, a row in which a value of column L is greater than 4 is not used for transmitting the URLLC service data. Therefore, when determining a quantity of bits of feedback information for the URLLC service data, the terminal determines the quantity of bits of the feedback information based on values corresponding to rows other than the 13th row and the 14th row as shown in Table 1.

For eMBB service data, because a delay requirement of the eMBB service data is not high, it is unnecessary to use a short TTI for transmission. For example, a row in which a value of column L is greater than 4 is used for transmitting the eMBB service data. Therefore, when determining a quantity of bits of feedback information for the eMBB service data, the terminal determines the quantity of bits of the feedback information based on values of the 13th row and the 14th row as shown in Table 1.

TABLE 1

| Row index | dmrs-TypeA-Position | PDSCH mapping type | K0 | S | L |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| (Note 1) | | | | | |
| 13 | 2,3 | Type B | 0 | 2 | 7 |
| (Note 1) | | | | | |

TABLE 1-continued

| Row index | dmrs-TypeA-Position | PDSCH mapping type | K0 | S | L |
|---|---|---|---|---|---|
| 14 | 2 | Type A | 0 | 2 | 12 |
| (Note 1) | 3 | Type A | 0 | 3 | 11 |
| 15 | 2,3 | Type B | 1 | 2 | 4 |
| 16 | | Reserved | | | |

Note 1:
If the PDSCH was scheduled with SI-RNTI in PDCCH Type0 common search space, the UE may assume that this PDSCH resource allocation is not applied The communications device obtains a target parameter set, determines, according to at least one first parameter value used for transmitting a first kind of data in the target parameter set, a quantity of bits for transmission of feedback information associated with the first kind of data, and removes at least one second parameter value that is not used for transmitting the first kind of data so that the at least one second parameter value is no longer used as a basis for determining the quantity of bits of the feedback information associated with the first kind of data, thereby avoiding redundant information in the feedback information.

Figure 4:
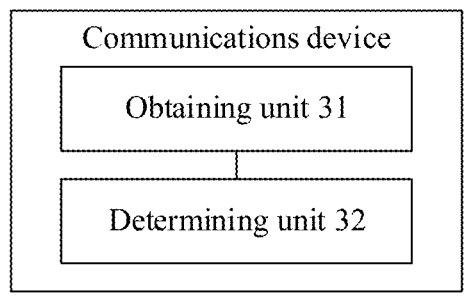
FIG. 4 is a schematic structural composition diagram of a communications device according to an implementation of this application.

An implementation of this application further provides a communications device. FIG. 4 is a schematic structural composition diagram of a communications device according to an implementation of this application. As shown in FIG. 4, the communications device includes an obtaining unit 31 and a determining unit 32, where the obtaining unit 31 is configured to obtain a target parameter set, where the target parameter set includes at least one first parameter value and at least one second parameter value, the at least one first parameter value is used for transmitting a first kind of data, and the at least one second parameter value is not used for transmitting the first kind of data; and the determining unit 32 is configured to determine, according to the at least one first parameter value, a quantity of bits for transmission of feedback information associated with the first kind of data.

Figure 5:
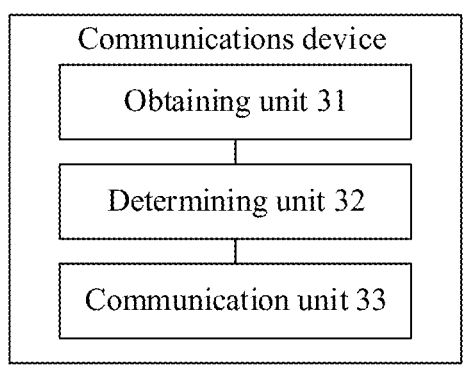
FIG. 5 is another schematic structural composition diagram of a communications device according to an implementation of this application.

In an optional implementation of this application, as shown in FIG. 5, the communications device further includes: a communication unit 33, configured to receive a plurality of kinds of data, where parameters of different kinds of data in the plurality of kinds of data are different, and the plurality of kinds of data includes the first kind of data.

That the parameters of different kinds of data in the plurality of kinds of data are different includes at least one of the following: priorities of different kinds of data in the plurality of kinds of data are different; service kinds of different kinds of data in the plurality of kinds of data are different; reliability requirement parameters of different kinds of data in the plurality of kinds of data are different; feedback delay requirement parameters of different kinds of data in the plurality of kinds of data are different; and transmission time interval lengths used by different kinds of data in the plurality of kinds of data are different.

In an optional implementation of this application, the plurality of kinds of data shares the target parameter set.

In an optional implementation of this application, data kinds of the plurality of kinds of data are determined based on parameter values in the target parameter set. It can be understood that, the determining unit 32 is further configured to determine a data kind according to a parameter value in the target parameter set, where the determined data kind is one kind in the plurality of kinds of data.

Figure 6:
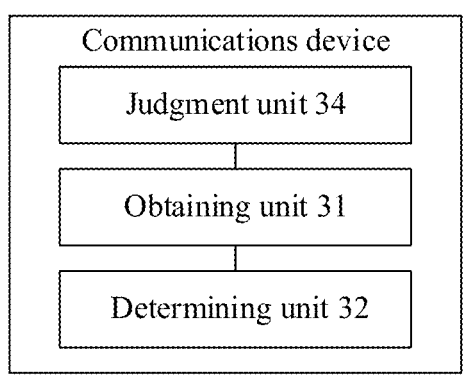
FIG. 6 is still another schematic structural composition diagram of a communications device according to an implementation of this application.

In an optional implementation of this application, as shown in FIG. 6, the communications device further includes a judgment unit 34, configured to determine whether a parameter value in the target parameter set satisfies a first threshold range, and determine, according to a determining result, whether the corresponding parameter value is used for transmitting the first kind of data.

In an optional implementation of this application, as shown in FIG. 5, the communications device further includes the communication unit 33, configured to receive the first threshold range configured by the network device; or the determining unit 32, configured to determine the first threshold range based on a pre-agreed manner.

In an optional implementation of this application, as shown in FIG. 6, the communications device further includes a judgment unit 34, configured to determine, according to a granularity associated with a parameter value in the target parameter set, whether the corresponding parameter value is used for transmitting the first kind of data.

In an optional implementation of this application, the quantity of bits is a quantity of bits of the feedback information transmitted by a physical channel. Alternatively, the quantity of bits is a quantity of bits of the feedback information transmitted by a time unit.

In an optional implementation of this application, the obtaining unit 31 is configured to obtain the target parameter set configured by the network device; or obtain the target parameter set based on a pre-agreed manner.

In an optional implementation of this application, the target parameter set includes at least one of the following parameter sets: an HARQ feedback timing set or a physical downlink shared channel time domain resource set.

It should be noted that, when the communications device provided in the foregoing implementation determines uplink control information, the division of the foregoing program modules is only used as an example for description. During actual application, the foregoing processing may be allocated to and completed by different program modules according to requirements, that is, an internal structure of the communications device is divided into different program modules, to complete all or some of the processing described above. In addition, the communications device provided in the foregoing implementation belongs to the same concept as the implementation of the method for determining uplink control information. For a specific implementation process, refer to the method implementation. Details are not described herein again.

Figure 7:
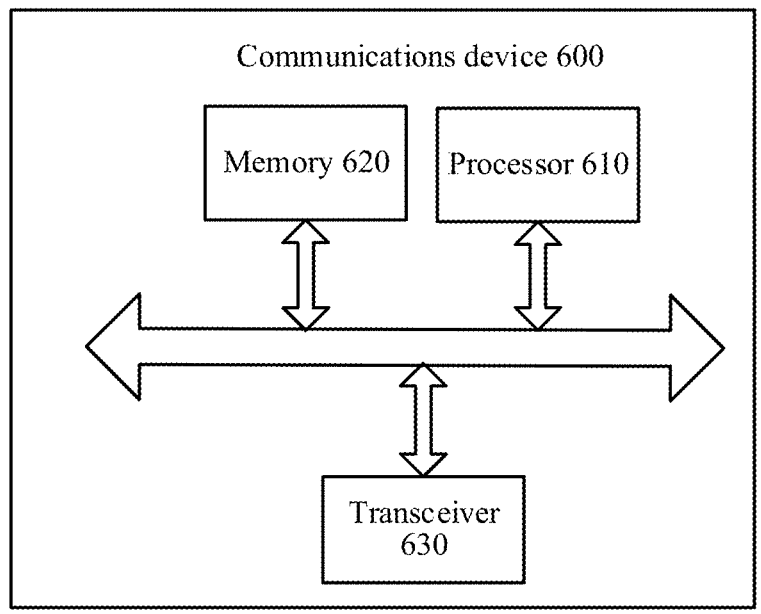
FIG. 7 is a schematic structural diagram of a communications device according to an implementation of this application.

FIG. 7 is a schematic structural diagram of a communications device according to an implementation of this application. The communications device in this implementation of this application may be a terminal or a network device. The communications device 600 in FIG. 7 includes a processor 610. The processor 610 may invoke a computer program from a memory and run the computer program to perform the method in this implementation of this application.

In at least one implementation, as shown in FIG. 7, the communications device 600 may further include a memory 620. The processor 610 may invoke the computer program from the memory 620 and run the computer program to perform the method in this implementation of this application.

The memory 620 may be a separate device independent of the processor 610, or may be integrated in the processor 610.

In at least one implementation, as shown in FIG. 7, the communications device 600 may further include a transceiver 630. The processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include an antenna, where one or more antennas may be provided.

In at least one implementation, the communications device 600 may specifically be the terminal or the network device in the implementation of this application, and the communications device 600 may implement corresponding procedures implemented by the terminal or the network device in the methods of the implementation of this application. For brevity, details are not described herein again.

Figure 8:
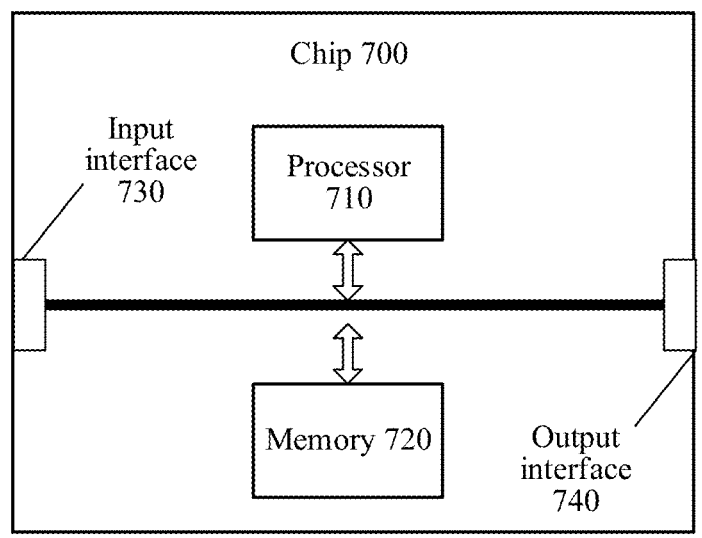
FIG. 8 is a schematic structural diagram of a chip according to an implementation of this application.

FIG. 8 is a schematic structural diagram of a chip according to an implementation of this application. The chip 700 in FIG. 8 includes a processor 710. The processor 710 may invoke a computer program from a memory and run the computer program to perform the method in the implementation of this application.

In at least one implementation, as shown in FIG. 8, the chip 700 may further include a memory 720. The processor 710 may invoke a computer program from the memory 720 and run the computer program to perform the method in the implementation of this application.

The memory 720 may be a separate device independent of the processor 710, or may be integrated in the processor 710.

In at least one implementation, the chip 700 may further include an input interface 730. The processor 710 may control the input interface 730 to communicate with other devices or chips, specifically, obtain information or data sent by other devices or the chips.

In at least one implementation, the chip 700 may further include an output interface 740. The processor 710 may control the output interface 740 to communicate with other devices or chips, specifically, output information or data to other devices or chips.

In at least one implementation, the chip may be applied to the terminal or the network device in the implementation of this application, and the chip may implement corresponding procedures implemented by the terminal or the network device in the methods of the implementations of this application. For brevity, details are not described herein again.

It should be understood that, the chip mentioned in this implementation of this application may also be referred to as a system-level chip, a system chip, a chip system, a system-on-chip, or the like.

It should be understood that, the processor in this implementation of this application may be an integrated circuit chip and has a signal processing capability. In an implementation process, steps of the foregoing method implementation may be completed by using an integrated logic circuit of hardware in the processor or instructions in a form of software. The processor may be a general purpose processor, a digital signal processor (DSP), an application-specific integrated circuit (ASIC), a field programmable gate array (FPGA), or other programmable logic devices, a discrete gate or a transistor logic device, and a discrete hardware component. The processor may implement or perform the methods, the steps and the logical block diagrams that are disclosed in the implementations of this application. The general purpose processor may be a microprocessor or the processor may be any conventional processor or the like. The steps of the methods disclosed with reference to the implementations of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

It can be understood that, the memory in this implementation of this application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through exemplary but non-limitative descriptions, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), may be used. It should be understood that, the memory in the system and the method described in this specification is intended to include, but is not limited to, these memories and any other memory of a proper type.

It should be understood that, the foregoing memory is exemplary but not limitative. For example, the memory in this implementation of this application may further be a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), a direct rambus RAM (DRRAM), and the like. That is, the memory in this implementation of this application is intended to include, but is not limited to, these memories and any other memory of a proper type.

An implementation of this application further provides a computer-readable storage medium configured to store a computer program.

In at least one implementation, the computer-readable storage medium may be applied to the terminal or the network device in the implementation of this application, and the computer program causes a computer to perform corresponding procedures implemented by the terminal or the network device in the methods of the implementations of this application. For brevity, details are not described herein again.

An implementation of this application further provides a computer program product, including computer program instructions.

In at least one implementation, the computer program product may be applied to the terminal or the network device in the implementation of this application, and the computer program instructions cause a computer to perform corresponding procedures implemented by the terminal or the network device in the methods of the implementations of this application. For brevity, details are not described herein again.

An implementation of this application further provides a computer program.

In at least one implementation, the computer program may be applied to the terminal or the network device in the implementation of this application. When being run in a computer, the computer program causes the computer to perform corresponding procedures implemented by the terminal or the network device in the methods of the implementations of this application. For brevity, details are not described herein again.

A person of ordinary skill in the art may notice that the exemplary units and algorithm steps described with reference to the implementations disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method implementations, and details are not described herein again.

In the several implementations provided in this application, it should be understood that the disclosed device and method may be implemented in other manners. For example, the described apparatus implementation is merely exemplary. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual requirements to achieve the objectives of the solutions of the implementations.

In addition, functional units in the implementations of this application may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the method implementations of this application. The foregoing storage medium includes: any medium that can store program code, such as a USB flash drive, a removable hard disk, a read-only memory (ROM), a random access memory (RAM), a magnetic disk, or an optical disc.

The descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining uplink control information, the method comprising:
obtaining, by a communications device, a target parameter set, wherein the target parameter set comprises at least one first parameter value and at least one second parameter value, the at least one first parameter value is used for transmitting a first kind of data, and the at least one second parameter value is not used for transmitting the first kind of data; and
determining, by the communications device according to the at least one first parameter value, a quantity of bits for transmission of feedback information associated with the first kind of data,
wherein the target parameter set comprises a hybrid automatic repeat request (HARQ) feedback timing set,
wherein the method further comprises receiving, by the communications device, a plurality of kinds of data, wherein parameters of different kinds of data in the plurality of kinds of data are different, and the plurality of kinds of data comprises the first kind of data,
wherein the plurality of kinds of data shares the target parameter set.

2. The method according to claim 1, wherein priorities of different kinds of data in the plurality of kinds of data are different.

3. The method according to claim 1, wherein the quantity of bits is a quantity of bits of the feedback information transmitted by a physical channel.

4. The method according to claim 1, wherein the target parameter set is configured by a network device.

5. The method according claim 1, wherein different duration units separately corresponding to the first parameter value and the second parameter value in the target parameter set are separately used for transmitting first kind of data and second kind of data.

6. The method according to claim 1, wherein the communications device is a terminal or a network device.

7. A communications device, comprising:
a processor; and
a memory storing a computer program which, when executed by a processor, causes the processor to:
obtain a target parameter set, wherein the target parameter set comprises at least one first parameter value and at least one second parameter value, the at least one first parameter value is used for transmitting a first kind of data, and the at least one second parameter value is not used for transmitting the first kind of data; and
determine, according to the at least one first parameter value, a quantity of bits for transmission of feedback information associated with the first kind of data,
wherein the target parameter set comprises a hybrid automatic repeat request (HARQ) feedback timing set,
wherein the communications device further comprises a communication unit, configured to receive a plurality of kinds of data, wherein parameters of different kinds of data in the plurality of kinds of data are different, and the plurality of kinds of data comprises the first kind of data,
wherein the plurality of kinds of data shares the target parameter set.

8. The communications device according to claim 7, wherein priorities of different kinds of data in the plurality of kinds of data are different.

9. The communications device according to claim 7, wherein the quantity of bits is a quantity of bits of the feedback information transmitted by a physical channel.

10. The communications device according to claim 7, wherein the target parameter set is configured by a network device.

11. The communications device according claim 7, wherein different duration units separately corresponding to the first parameter value and the second parameter value in the target parameter set are separately used for transmitting first kind of data and second kind of data.

12. The communications device according to claim 7, wherein the communications device is a terminal or a network device.

* * * * *